United States Patent
Potier et al.

[19]

[11] Patent Number: 5,813,489
[45] Date of Patent: Sep. 29, 1998

[54] ELECTRICAL CONNECTING DEVICE FOR A MOTORIZED FAN UNIT MOUNTED ON A FINNED BODY OF A HEAT EXCHANGER

[75] Inventors: Michel Potier, Rambouillet; Eduardo Santander, Vitry-sur-Seine, both of France

[73] Assignee: Valeo Thermique Moteur, France

[21] Appl. No.: 592,990

[22] Filed: Jan. 29, 1996

[30] Foreign Application Priority Data

Jan. 30, 1995 [FR] France ................................. 95 01044

[51] Int. Cl.⁶ .................................................. B60K 11/00
[52] U.S. Cl. ....................................... 180/68.1; 180/68.4
[58] Field of Search ............................. 180/68.1, 68.4, 180/68.6; 123/41.49; 165/122

[56] References Cited

U.S. PATENT DOCUMENTS

| | | |
|---|---|---|
| 3,324,938 | 6/1967 | Berkoff . |
| 4,257,554 | 3/1981 | Willingham ............................. 165/122 |
| 4,548,548 | 10/1985 | Gray, III .............................. 123/41.49 |
| 5,002,019 | 3/1991 | Klaucke et al. . |
| 5,476,138 | 12/1995 | Iwasaki et al. ......................... 180/68.4 |
| 5,597,038 | 1/1997 | Potier ..................................... 180/68.4 |

FOREIGN PATENT DOCUMENTS

| | | |
|---|---|---|
| 0 183 596 | 6/1986 | European Pat. Off. . |
| 0 186 581 | 7/1986 | European Pat. Off. . |
| 0 316 137 | 5/1989 | European Pat. Off. . |
| 0 380 917 | 8/1990 | European Pat. Off. . |
| 0198311 | 12/1982 | Japan ................................. 123/41.49 |

*Primary Examiner*—Brian L. Johnson
*Assistant Examiner*—Frank Vanaman
*Attorney, Agent, or Firm*—Morgan & Finnegan, LLP

[57] ABSTRACT

In an assembly consisting of a heat exchanger, such as a cooling radiator for the internal combustion engine of a motor vehicle, together with a motorized fan unit mounted on the finned body of the heat exchanger for providing a forced draught through the latter, the motorized fan unit comprises an electric motor fixed on the heat exchanger body and driving a fan rotor which lies facing a major face of the heat exchanger body. A bundle of electric cables extending from the motor extends along at least part of that major face. The assembly includes an electrical connecting means including the bundle of cables and fastening means which holds the bundle of cables flat against the heat exchanger body and out of any contact with the fan rotor.

9 Claims, 3 Drawing Sheets

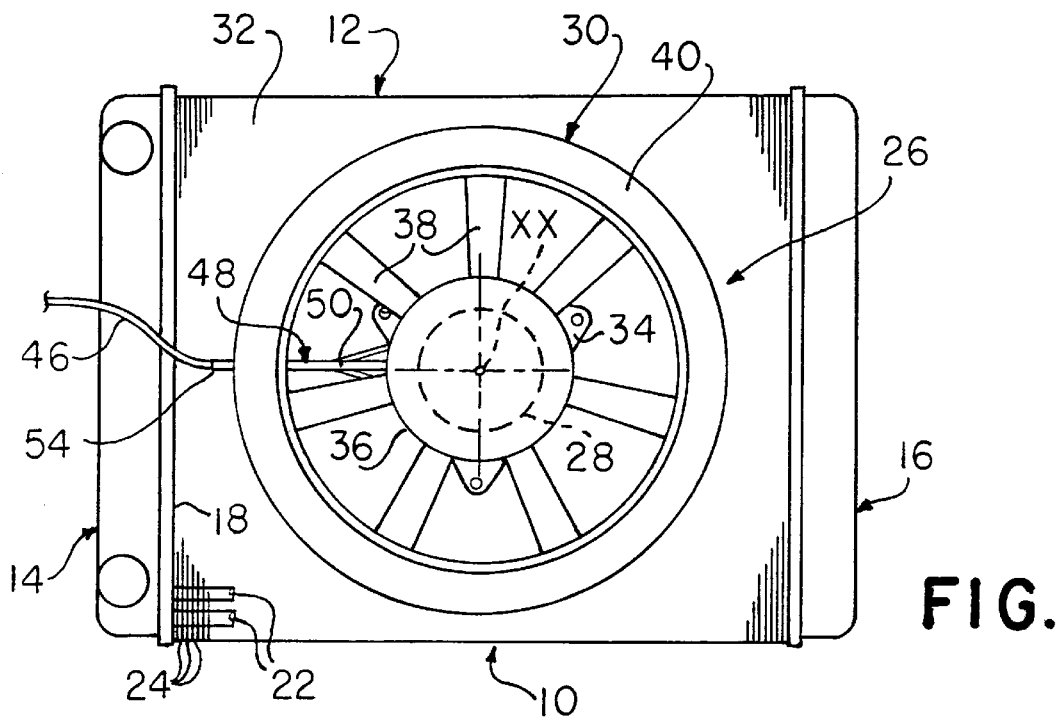
FIG. 1
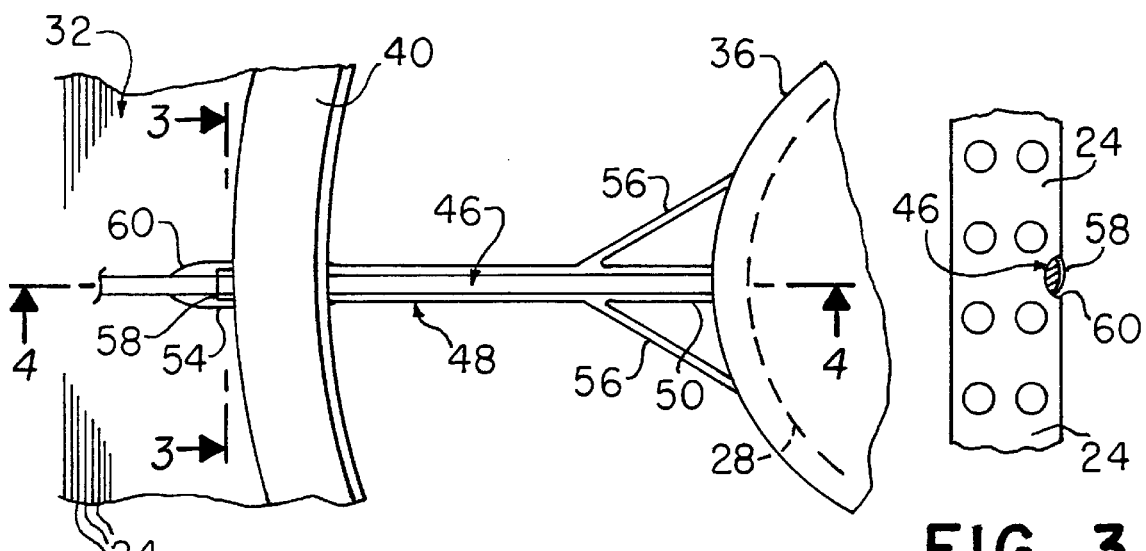
FIG. 2
FIG. 3

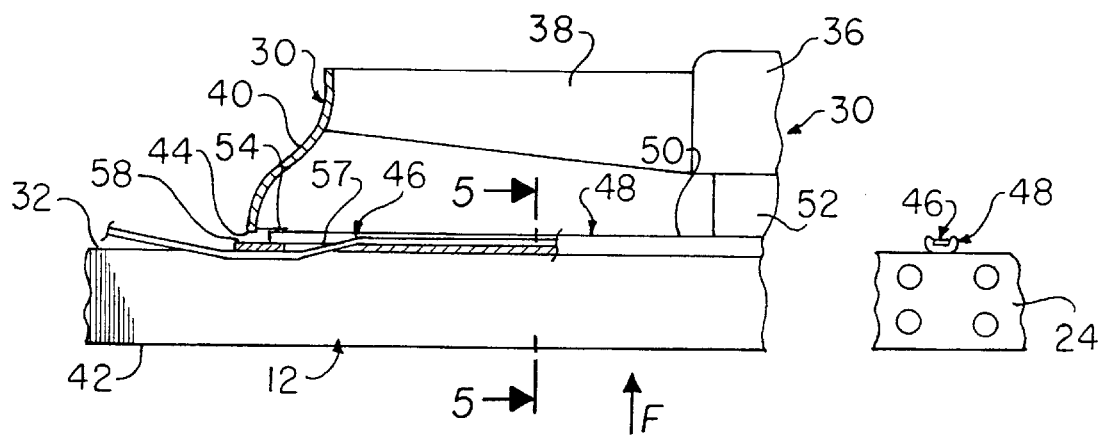
FIG. 4
FIG. 5
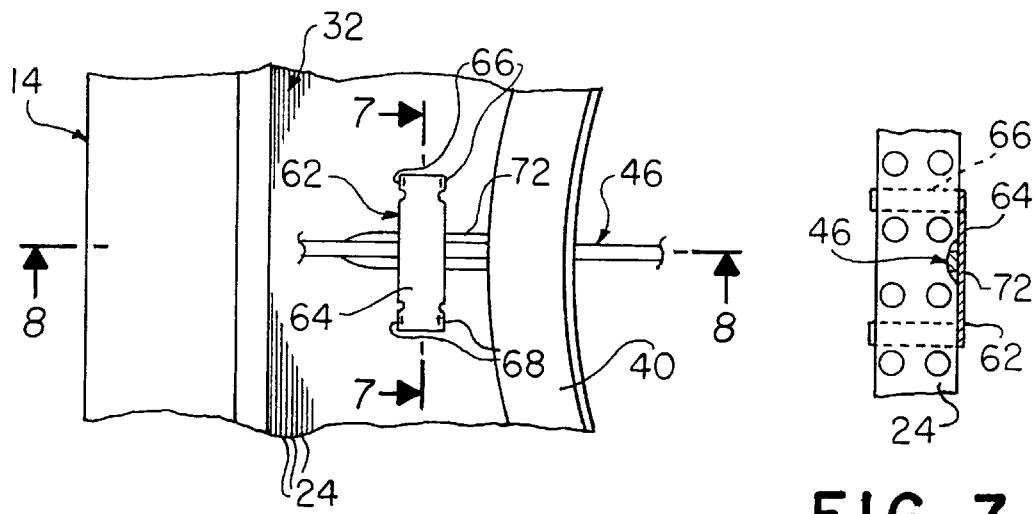
FIG. 6
FIG. 7

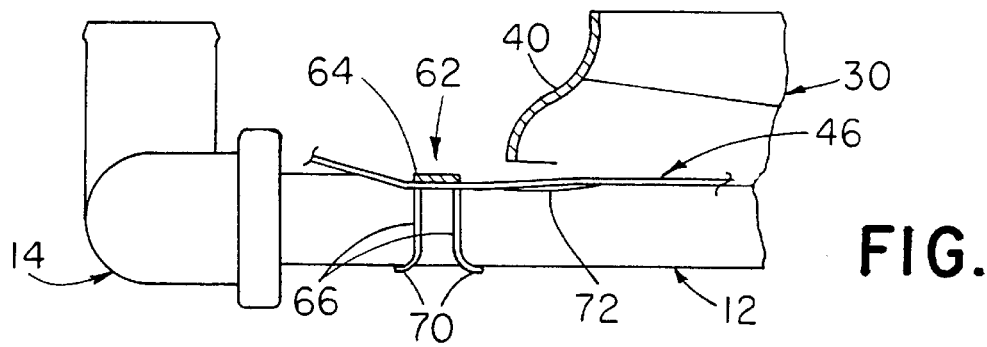
FIG. 8
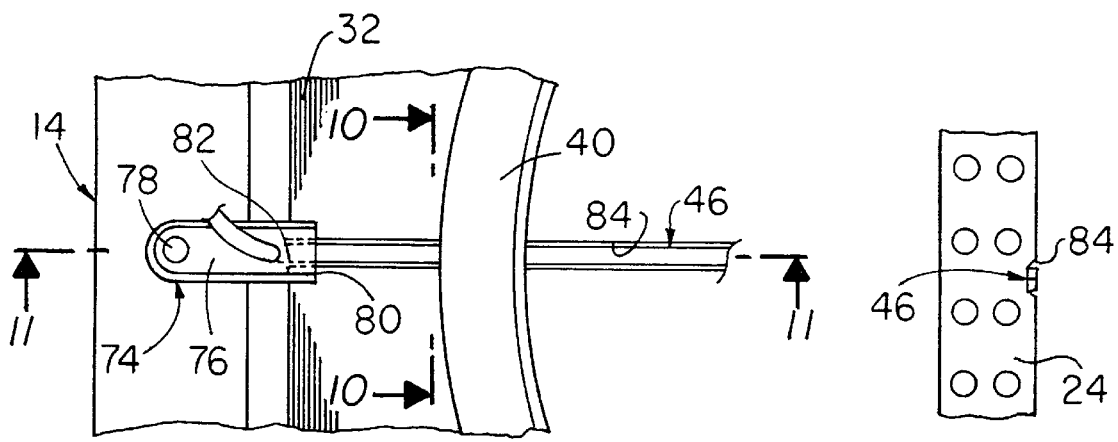
FIG. 9
FIG. 10
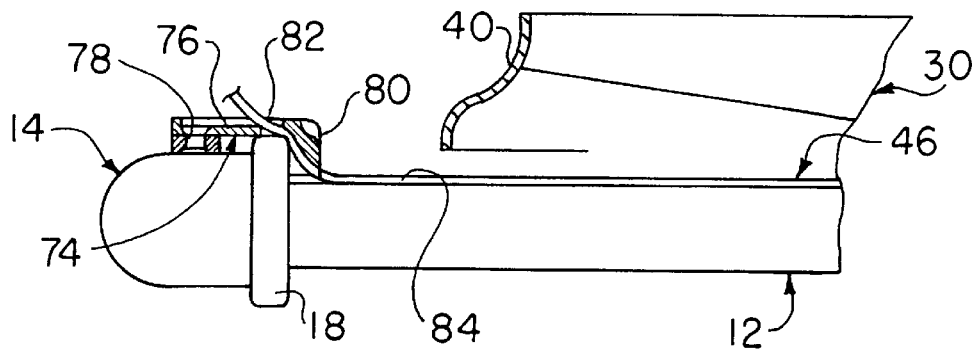
FIG. 11

ELECTRICAL CONNECTING DEVICE FOR A MOTORIZED FAN UNIT MOUNTED ON A FINNED BODY OF A HEAT EXCHANGER

FIELD OF THE INVENTION

This invention relates to an electrical connecting device for supplying power to a motorised fan unit mounted on a finned body of a heat exchanger, in particular a heat exchanger consisting of a radiator for cooling an internal combustion engine of a motor vehicle. More particularly, the invention is concerned with the electrical connections for a motorised fan unit that comprises an electric motor fixed on the finned body of the heat exchanger and driving a fan rotor which is disposed in facing relationship with one major face of the finned body.

BACKGROUND OF THE INVENTION

A heat exchanger of the above type is known from the publication of French patent specification No. 2 573 128, which discloses an arrangement in which the electric motor of the motorised fan unit is secured directly on the body of the heat exchanger instead of being secured either by cross members (or traverses), or by elements of the chassis or bodywork of the vehicle, as in conventional arrangements. The arrangement disclosed in the above mentioned French patent specification enables, in particular, the overall size of the assembly consisting of the heat exchanger and motorised fan unit to be reduced, while also reducing noise set up by the fan and also improving the flow of air delivered to the body of the heat exchanger by the fan.

However, this known arrangement gives rise to a problem in connection with the electrical connections for the power supply to the motorised fan unit, due to the fact that the electric motor is located between the finned body of the heat exchanger and the fan itself, by contrast with conventional arrangements in which the fan rotor lies between the finned body and the electric motor.

DISCUSSION OF THE INVENTION

An object of the present invention is to provide a solution to all of the above mentioned problems, and which provides an electrical connecting device of the general type referred to above which enables the electric motor to be connected electrically in a particular simple and effective way.

According to the invention, an electrical connecting device for a motorised fan unit mounted on a finned body of a heat exchanger, in which the motorised fan unit comprises an electric motor fixed on the finned body and driving a fan rotor disposed in facing relationship with one major face of the finned body, is characterised in that it comprises a bundle of electric cables which extend from the motor of the motorised fan unit and along at least part of the major face of the body, together with fastening means adapted to hold the cable bundle flat against the finned body in such a way as to be out of any contact with the fan rotor.

As a result, the bundle of cables is in no danger of being damaged, either by the fan rotor or by the fins of the heat exchanger as a result of any vibrations in use.

In one embodiment of the invention, the fastening means comprise a channel member with a U-shaped profile which is adapted to receive the cable bundle, and which has an inner end connected to the electric motor and an outer end extending beyond the perimeter of the fan rotor, so as to extend beyond the working zone of the fan rotor.

Preferably, the inner end of the channel member is attached by integral bridge elements to a casing which surrounds the motor of the motorised fan unit.

According to a preferred feature of the invention, the outer end of the channel member includes a transverse cap element situated between the bundle of electric cables and the perimeter of the fan rotor.

The cooling fins of the heat exchanger body are preferably deformed locally, at least in a region close to the perimeter of the fan rotor, in order to define a hollow depression which constitutes a duct for receiving the channel member and the bundle of electric cables.

In another embodiment, the fastening means include at least one cross bar, which transversely overlies the bundle of cables and which is provided with fastening lugs engaging between the cooling fins.

This cross bar is preferably situated close to the perimeter of the fan rotor, and the cooling fins of the heat exchanger body are deformed locally, at least in the region in which the cross bar is situated, so as to define a hollow depression constituting a duct for receiving the bundle of cables.

The invention is applicable especially to a heat exchanger which includes at least one header joined to the finned body through a header plate.

In an alternative or complementary arrangement according to a feature of the invention, the fastening means comprise a bent-back flange which is fixed to the header and which is adapted to hold the bundle of cables against the finned body in the region of its junction with the header plate. This bent-back flange enables the bundle of cables to be tensioned in that part thereof which extends between the electric motor and the header.

The fins of the heat exchanger body are preferably deformed locally over at least part of the length of the finned body, so as to define a hollow depression constituting a duct for receiving the bundle of cables. This hollow depression may be formed by local deformation of the cooling fins after the finned body has been assembled, or alternatively it may be formed beforehand, by cutting out a portion of each fin. In that case, identical cooling fins are preferably used, so that the duct extends over the whole length of the finned body.

Where the body of the heat exchanger has a large number of cooling fins in the form of thin metal plates arranged parallel to each other, the hollow depression which defines the duct for receiving the bundle of cables preferably extends in a direction transverse to the cooling fins.

Further features and advantages of the invention will appear more clearly on a reading of the detailed description of preferred embodiments of the invention which follows, and which is given by way of example only and with reference to the accompanying drawings.

BRIEF DESCRIPTION OF THE DRAWINGS

FIG. 1 is a plan view of a heat exchanger equipped with a motorised fan unit and with an electrical connecting device in accordance with the invention.

FIG. 2 is a detail, on an enlarged scale, of part of FIG. 1 in a first embodiment of the invention.

FIG. 3 is a view in cross section taken on the line III—III in FIG. 2.

FIG. 4 is a view in cross section taken on the line IV—IV in FIG. 2.

FIG. 5 is a view in cross section taken on the line V—V in FIG. 4.

FIG. 6 is a scrap view similar to that in FIG. 2, but showing another embodiment of the invention.

FIG. 7 is a view in cross section taken on the line VII—VII in FIG. 6.

FIG. 8 is a view in cross section taken on the line VIII—VIII in FIG. 6.

FIG. 9 is a view similar to that in FIG. 2, but showing a further embodiment of the invention.

FIG. 10 is a view in cross section taken on the line X—X in FIG. 9.

FIG. 11 is a view in cross section taken on the line XI—XI in FIG. 9.

DESCRIPTION OF PREFERRED EMBODIMENTS OF THE INVENTION

Reference is first made to FIG. 1, which shows a heat exchanger 10 which is typically a radiator for the cooling of an internal combustion engine of a motor vehicle. The heat exchanger 10 comprises a body or matrix 12 of the finned type, which is fitted between two water headers 14 and 16 by means of two header plates 18 and 20. The radiator body 12 consists of a bundle of tubes 22 which extend through a large number of cooling fins 24. The ends of the tubes 22 are received sealingly in the header plates 18 and 20. The cooling fins 24 are in the form of thin metal plates of generally rectangular form, which are disposed parallel to each other and at right angles to the axes of the tubes 22.

A motorised fan unit 26 is mounted directly on the radiator body 12. The fan unit 26 comprises a motor 28 which drives a fan rotor 30 in rotation about an axis XX. The fan rotor 30 is arranged facing towards a generally rectangular major face 32 of the radiator body 12, which extends between the two header plates 18 and 20. The motor 28 is fixed to a triangular support 34 which is itself fixed on the radiator body 12 by any appropriate means, which may for example be those described in French patent specification No. 2 573 128 mentioned above.

The fan rotor 30 comprises a hub 36 which is fixed on the shaft of the drive motor 28, and which is joined through its radial blades 38 to a generally circular skirt or shroud 40. The shroud 40, which defines the perimeter of the fan rotor, has a profile of any suitable selected form (see FIG. 4 for example), for the purpose of directing a stream of air F which is forced through the heat exchanger from one major face 42 of the radiator body 12, to leave the latter through the other major face 32. As can be seen in FIG. 4, the shroud 40 includes an annular flange 44 directed towards the major face 32 of the radiator body, the outer edge of the flange 44 being very close to the face 32.

The electric motor 28 is supplied with power through an electrical connecting means comprising a bundle 46 of electric cables, which extend from the motor 28, along at least part of the major face 32 of the radiator body 12, and beyond the header 14 (FIG. 1).

In the embodiment shown in FIGS. 1 to 5, the arrangement includes a channel member 48, best seen in FIG. 5 and having a cross section which is generally U-shaped. The channel member 48 has an inner end 50 which is attached to a casing 52 surrounding the electric motor 28, while its outer end 54 extends beyond the perimeter of the fan rotor which is defined by the shroud 40. The channel member 48 is generally straight, and extends in a radial direction with respect to the axis of rotation XX of the motor, being generally transverse to the longitudinal direction defined by the cooling fins 24.

The inner end 50 of the channel member 48 is attached to the casing 52 through two integral connecting bridges 56. The channel member 48 can thus be made in one piece with the casing 52, for example by moulding in a suitable plastics material. In the region of its outer end 54, the channel member 48 has an axial slot 57, which enables the bundle of cables 46 received in the member 48 to pass through the base of the latter so as to take them away from the free edge 44 of the shroud 40 of the fan rotor (see in particular FIG. 4).

As can best be seen in FIGS. 2, 3 and 4, the outer end 54 of the channel member 48 includes a transverse cap element 58 which overlies the cable bundle 46, so as to be interposed between the latter and the free edge 44 of the fan rotor shroud. The cap element 58 lies in line with the free edge 44, as is best seen in FIG. 4, thus protecting the cable bundle 46 from any accidental contact with the shroud edge 44.

As is best seen in FIGS. 2 and 3, the cooling fins 24 are deformed locally in the region adjacent to the shroud 40 of the fan rotor, so as to provide a hollow depression which constitutes a duct in which the outer end of the channel member 48 and the bundle of cables 46 are received. This hollow depression 60 enables the cable bundle 46 to be separated even more from the free edge 44 of the fan rotor shroud.

As a result, the bundle of cables 46 is held flat against the major face 32 of the radiator body 12 by the channel member 48, so that the cables are safely out of any contact with the fan rotor. They are also sheltered from vibrations which could damage the cables by virtue of contact of the latter with the cooling fins 24.

Reference is now made to FIGS. 6 to 8 showing a second embodiment of the invention. In this arrangement, the bundle of cables 46 is applied directly against the edges of the cooling fins 24. Here, the fastening means comprise a cross bar 62 having an oblong body 64. The cross bar 62 is arranged to extend transversely across the cable bundle 46 so as to cover it. In this example, the cross bar 62 covers the bundle 46 transversely in a region which is close to the shroud 40 of the fan rotor, and outside the latter.

The body 64 of the cross bar has at one end a pair of bent-back lugs 66, while at its other end it has another pair of bent-back lugs 68. These lugs are arranged to engage between the cooling fins and to be deformed subsequently so that their ends 70 project outwards (as is best seen in FIG. 8). The cable bundle 46 is thus completely held flat against the radiator body 12.

In order further to remove the cable bundle 46 from any contact with the shroud 40 of the fan rotor, the cooling fins 24 are deformed locally in the vicinity of the cross bar 62, so as to provide a hollow depression 72 similar to the depression 60 of FIGS. 2 and 3.

Reference is now made to FIGS. 9 to 11 showing a third embodiment of the invention. In these Figures, the fastening means comprise an upset flange 74 which is fixed on to a lateral wall of the header 14, on the same side as the major face 32 of the radiator body. The flange 74 comprises an elongated body portion 76, one end of which is formed with a hole 78 for fastening of the flange on to the header. The other end of the body portion 76 includes a lug 80 which is bent back at right angles. The body portion 76 is formed with a hole 62 lying close to the zone of connection to the bent-back lug 80.

The lug 74 extends in a direction transversely to that of the cooling fins, beyond and in line with the cable bundle 46. The body portion 76 and the bent-back end 80 are engaged against the header plate 18 at the level of the junction of the latter with the radiator body 12.

The bundle of cables 46 is held flat against the major face 32 of the radiator body, and is then gripped between the flange 74 and the edge of the header plate 18, whence it passes through the flange 74 via the hole 82. As a result, the bundle of cables 46 can be correctly tensioned, and applied firmly against the major face 32 of the radiator body 12, without any risk of being damaged by the fan rotor or by the cooling fins. The flange 74 can be used by itself, or in combination with the channel member 48 or cross bar 62 featured in the embodiments previously described.

Again, a local deformation is preferably formed in the cooling fins so as to provide a hollow depression which defines a duct for receiving the cable bundle 46; or, as shown in FIGS. 9 to 11, a notch 84 can be provided which extends over the whole length of the cable bundle.

Whatever embodiment of electrical connecting device according to the invention is selected, the tube bundle 46 is held flat against the major face 32 of the radiator body 12 and is maintained out of any contact with the fan rotor, while being sheltered from the vibrations mentioned above which could cause damage to the cables by rubbing against the cooling fins.

The invention is not limited to the embodiments described above by way of example, and it does extend to other versions. Thus for example, the invention can also be applied to other types of heat exchanger in which the cooling fins consist of corrugated plates instead of flat, parallel plates.

What is claimed is:

1. An assembly comprising, in combination, a heat exchanger having a body including cooling fins, and a motorized fan unit mounted on said body and having an electric motor and a fan rotor coupled to the electric motor so as to be driven thereby, with means securing the electric motor on said body of the heat exchanger, the heat exchanger body defining a major face thereof and the fan rotor being disposed in facing relationship with said major face, wherein the assembly further includes electrical connecting means having a bundle of electrical cables extending from said motor and alone at least part of said major face of the body of the heat exchanger, together with fastening means holding said bundle flat against the body of the heat exchanger and away from any contact with the fan rotor, wherein said fastening means include a channel member defining a U-shaped profile receiving said bundle therein, and having an inner end connected to the motor and an outer end, with said outer end extending beyond the perimeter of the fan rotor and therefore beyond the working zone of the latter.

2. An assembly according to claim 1, wherein said motorized fan unit includes a casing surrounding the motor, and connecting bridges joining said inner end of the channel member to said casing.

3. An assembly according to claim 1, wherein said outer end of the channel member includes a transverse cap element situated between said cable bundle and the perimeter of the fan rotor.

4. An assembly according to claim 1, wherein cooling fins of the body of the heat exchanger are deformed locally, at least in a region close to the perimeter of the fan rotor, so as to define a hollow depression constituting a duct for receiving said channel member and said cable bundle.

5. An assembly comprising, in combination, a heat exchanger having a body including cooling fins, and a motorized fan unit mounted on said body and having an electric motor and a fan rotor coupled to the electric motor so as to be driven thereby, with means securing the electric motor on said body of the heat exchanger, the heat exchanger body defining a major face thereof and the fan rotor being disposed in facing relationship with said major face, wherein the assembly further includes electrical connecting means having a bundle of electrical cables extending from said motor and along at least part of said major face of the body of the heat exchanger, together with fastening means holding said bundle flat against the body of the heat exchanger and away from any contact with the fan rotor, wherein said fastening means include at least one cross bar transversely overlying the cable bundle, the cross bar having fastening lugs engaging between said cooling fins.

6. An assembly according to claim 5, wherein the cross bar is located close to the perimeter of the fan rotor, said cooling fins being deformed locally, at least in a region thereof in which said cross bar is located, so as to define a hollow depression constituting a duct for receiving the cable bundle.

7. An assembly comprising, in combination, a heat exchanger having a body including cooling fins, and a motorized fan unit mounted on said body and having an electric motor and a fan rotor coupled to the electric motor so as to be driven thereby, with means securing the electric motor on said body of the heat exchanger, the heat exchanger body defining a major face thereof and the fan rotor being disposed in facing relationship with said major face, wherein the assembly further includes electrical connecting means having a bundle of electrical cables extending from said motor and along at least part of said major face of the body of the heat exchanger, together with fastening means holding said bundle flat against the body of the heat exchanger and away from any contact with the fan rotor, wherein the heat exchanger further includes at least one header and a header plate connecting said header to the finned body of the heat exchanger, said fastening means having a bent-back flange fixed to the header and holding the cable bundle against the body of the heat exchanger in the region of the junction of said body with the header plate.

8. An assembly according to claim 7, wherein the cooling fins are deformed locally over at least part of the length of the body of the heat exchanger, so as to define a hollow depression constituting a duct for receiving the cable bundle.

9. An assembly comprising, in combination, a heat exchanger having a body including cooling fins, and a motorized fan unit mounted on said body and having an electric motor and a fan rotor coupled to the electric motor so as to be driven thereby, with means securing the electric motor on said body of the heat exchanger, the heat exchanger body defining a major face thereof and the fan rotor being disposed in facing relationship with said major face, wherein the assembly further includes electrical connecting means having a bundle of electrical cables extending from said motor and along at least part of said major face of the body of the heat exchanger, together with fastening means holding said bundle flat against the body of the heat exchanger and away from any contact with the fan rotor, wherein said cooling fins are deformed locally so as to define a hollow depression constituting a duct for receiving the cable bundle, the cooling fins being thin metal plates parallel to each other, with said hollow depression extending in a direction transverse to the fins.

* * * * *